United States Patent [19]

Ghosh et al.

[11] Patent Number: 5,762,485
[45] Date of Patent: Jun. 9, 1998

[54] ZIRCONIA AND ZIRCONIA COMPOSITE CERAMIC SHAFTS FOR GEAR MICROPUMPS AND METHOD OF MAKING SAME

[75] Inventors: Syamal K. Ghosh; Dilip K. Chatterjee; David Alan Ash, all of Rochester, N.Y.

[73] Assignee: Eastman Kodak Company, Rochester, N.Y.

[21] Appl. No.: 709,426

[22] Filed: Sep. 6, 1996

[51] Int. Cl.[6] .................... F04C 2/18; F04C 15/00
[52] U.S. Cl. ............................ 418/152; 418/206.9
[58] Field of Search ...................... 418/152, 206.1, 418/206.9

[56] References Cited

U.S. PATENT DOCUMENTS

| | | | |
|---|---|---|---|
| 3,704,968 | 12/1972 | Haupt | 418/206.9 |
| 3,881,849 | 5/1975 | Commarmot et al. | 418/152 |
| 5,195,881 | 3/1993 | George, Jr. | 418/152 |
| 5,411,690 | 5/1995 | Ghosh et al. | 264/63 |
| 5,556,270 | 9/1996 | Komine et al. | 418/179 |

FOREIGN PATENT DOCUMENTS

| | | |
|---|---|---|
| 0 559 215 A1 | 3/1993 | European Pat. Off. |
| 01122963 | 5/1989 | Japan . |
| 2-102388 | 4/1990 | Japan ................... 418/152 |
| 5099195 | 4/1993 | Japan . |
| 2 138 074 A | 10/1984 | United Kingdom . |

*Primary Examiner*—John J. Vrablik
*Attorney, Agent, or Firm*—Clyde E. Bailey, Sr.

[57] ABSTRACT

An improved gear micropump (10) for delivering corrosive materials, particularly photographic materials, such as dyes and emulsions, has a pair of intermeshing gears (16,18) rotatably mounted on zirconia ceramic shafts (24,26). The ceramic shafts of the invention may be formed from zirconia and zirconia composite materials. The gear micropump (10) having the zirconia ceramic shafts (24,26) eliminates pulsation during fluid delivery and is resistant to wear and abrasion. Moreover the zirconia ceramic shafts (24,26) are strongly resistant to chemicals like photographic emulsions and dyes and, therefore, do not contaminate product with corrosive materials.

7 Claims, 3 Drawing Sheets

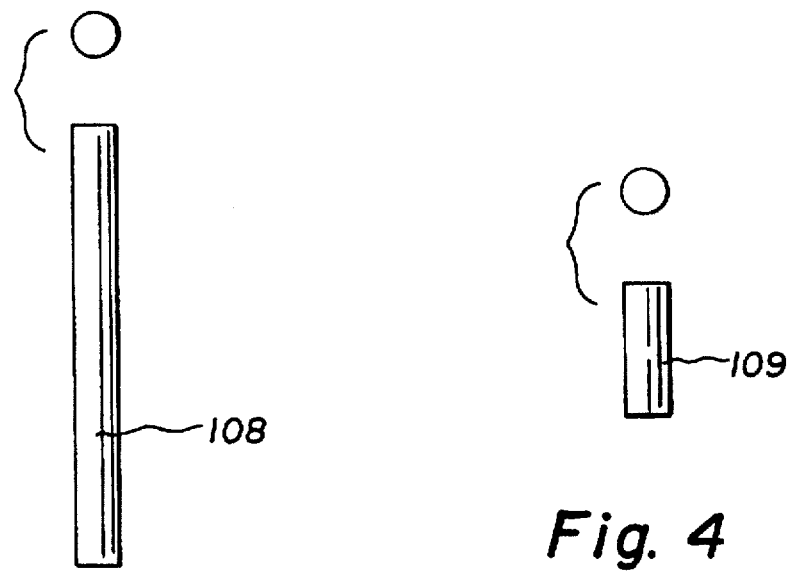
Fig. 3
Fig. 4
Fig. 5
Fig. 6

ZIRCONIA AND ZIRCONIA COMPOSITE CERAMIC SHAFTS FOR GEAR MICROPUMPS AND METHOD OF MAKING SAME

TECHNICAL FIELD

This invention relates to zirconia and zirconia composite ceramic shafts and a method of making same. The invention particularly concerns such ceramic shafts for gear micropumps useful generally for pumping a variety of corrosive materials including acids and bases as well as photographic emulsions and dyes in the manufacture of photographic films and papers. The tough, durable, wear and corrosion resistant zirconia ceramic shafts improves the pumping efficiency by eliminating pulsation during web coating and also extends the service life.

BACKGROUND OF THE INVENTION

Gear micropumps are generally used for their ability to deliver precise amount of fluid at a constant rate. They are very particularly well suited for delivery of photographic materials, such as dyes and emulsions, in the manufacture of photographic films. Existing gear micropumps are generally constructed from stainless steel for reasons of mechanical strength and corrosion resistance with the exception of certain parts such as enmeshing gears which are made from engineering plastics. For some applications, stainless steel constructions using plastic gears are acceptable. For applications of commercial gear micropumps in the field of precision photographic film coating there are many disadvantages. Although stainless steel shafts have considerable strength and corrosion resistance, yet they are prone to wear with time and are also susceptible to corrosion when come in contact with solution of silver halide salts in photographic emulsion. As a result, precision micropumps exhibit what is known as "pulsation" during continuous fluid delivery resulting from the loss of tolerance in the gear shaft assembly. Pulsation is defined as discontinuities in fluid delivery resulting in non-uniform coating thickness.

It is generally known that prior to our invention it has not been economically feasible and practical to construct gear micropumps entirely of ceramics. One reason for this is that the dimensional tolerances required are very high so that the ceramic pump can function, and not all "ceramic" materials will be useful for construction of pumps. As for example, gear shafts made from brittle ceramics such as alumina, silicon carbide, mullite, etc. are prone to breakage if the pump components are not assembled very carefully and with the highest degree of precision. Further, an all ceramic pump has not been practical because dimensional tolerances in the pump components must be satisfied within less than 50millionth of an inch to make those pumps workable. Moreover, enmeshing gears made from the above materials will tend to wear each other out because many ceramics are abrasive in nature.

U.S. Pat. No. 3,881,849 discloses a gear pump that is formed entirely of ceramic materials. According to the disclosure, the pump body having inlet and outlet ports, enmeshing gear wheels, and a drive shaft are each constructed entirely from a ceramic material. However, a shortcoming of this type of gear pump arrangement is that it will not and does not function using any ceramic material, for instance brittle ceramics such as alumina, silicon carbide, etc. For the reasons indicated above, such a gear micropump would display innumerable shortcomings if used to deliver corrosive materials, particularly dyes and emulsions in the manufacture of photographic films Thus, a need persists for a gear micropump useful for delivering photographic materials, such as dyes and emulsions, that eliminates pulsation, is efficient, tough, durable, and wear and corrosion resistant.

SUMMARY OF THE INVENTION

It is, therefore, an object of the invention to provide a gear micropump having zirconia ceramic gear shafts that is strongly resistant to chemicals like photographic emulsions and dyes and, therefore, does not contaminate the product with corrosive materials.

It is another object of the invention to provide a gear micropump that eliminates pulsation during fluid delivery.

Yet another object of the invention is to provide a gear micropump that produces more uniform coating on a running web.

It is a feature of the invention that a gear micropump useful for delivering photographic materials has a pair of intermeshing gears supported on zirconia ceramic shafts that enable the gear micropump to more efficiently pump fluid while eliminating pulsation during web coating.

To achieve these and other objects, features and advantages of the invention, in one aspect of the invention, there is provided an improved gear micropump for delivering photographic material, such as dyes and emulsions. The micropump of the invention is of the type having a pump body fonned with a gear receiving means. A fluid inlet port and discharge port are provided for receiving and then delivering the photographic material to a moving web. Intermeshing gears are arranged in the gear receiving means between the fluid inlet end and the fluid discharge end. Bearing means are arranged in a bearing receiving means. The improvement comprises a pair of zirconia and zirconia composite ceramic shafts arranged in the bearing receiving means for rotatably mounting the intermeshing gears.

In another aspect of the invention, a method of making ceramic shafts for a gear micropump useful for delivering photographic materials, comprising the steps of providing a ceramic powder comprising particulate zirconium oxide and a secondary oxide selected from the group consisting of MgO, CaO, $Y_2O_3$, $Sc_2O_3$, and rare earth oxides. The secondary oxide has a concentration, in the case of $Y_2O_3$, about 0.5 to about 5 mole percent; in the case of MgO, about 0.1 to about 1.0 mole percent; in the case of $CeO_2$, about 0.5 to about 15 mole percent; in the case of $Sc_2O_3$, about 0.5 to about 7.0 mole percent; and, in the case of CaO, from about 0.5 to about 5 mole percent, relative to the total of said zirconium oxide. The compacting further comprising fonning a blank from the compacted ceramic powder in a mold. The ceramic powder is compacted in the mold until a desired ceramic billet is formed. The ceramic billet is then shaped so as to form a near net-shaped ceramic shaft useful for the gear micropump of the invention. The near net-shaped ceramic shaft is sintered according to a predetermined schedule thereby forming a sintered ceramic shaft. Thereafter, the near net shaped ceramic shaft is further shaped to form the finished ceramic shaft.

Accordingly, important advantageous effects of the improved micropump useful for delivering corrosive materials, particularly photographic materials, such as dyes and emulsions, include elimination of pulsation and product contamination due commonly to corrosion and erosion. Other important advantages of the micropump of the invention include: a longer service life; reduced product rejection and equipment downtime; and, reduced equipment manufacturing cost.

BRIEF DESCRIPTION OF THE DRAWINGS

The foregoing as well as other objects, features and advantages of this invention will become more apparent from the following detailed description when taken in conjunction with the appended figures wherein:

FIGS. 3-4 are plain views of the green ceramic driving shaft and driven gear shaft of the invention; and, FIGS. 5-6 are plain views of the sintered and machined ceramic driving and driven gear shafts of the invention.

DETAILED DESCRIPTION OF THE INVENTION

Figure 1:
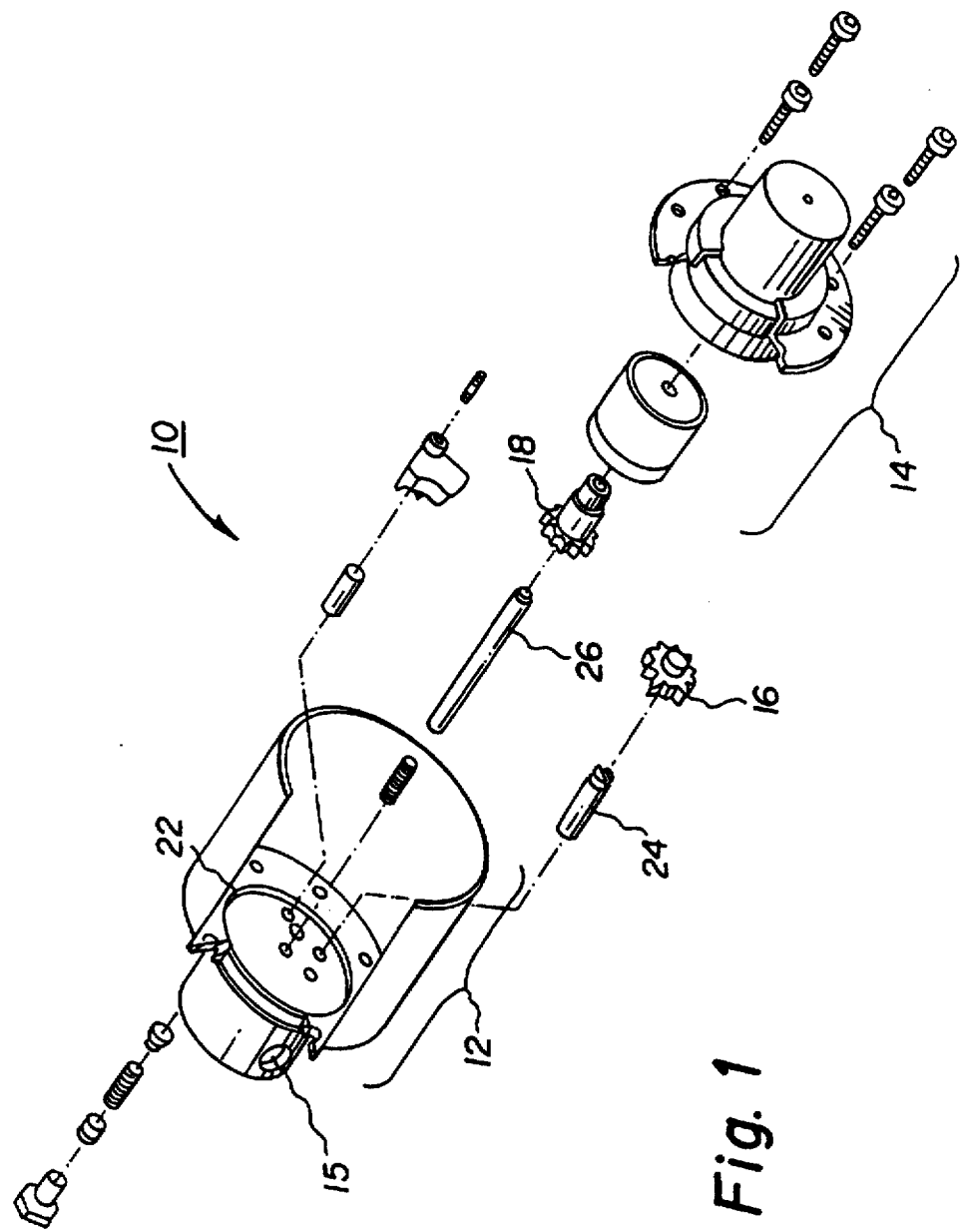
FIG. 1 is an exploded view of a gear micropump of the invention.

FIG. 1 illustrates an improved gear micropump 10 of the invention having zirconia and zirconia composite ceramic shafts for delivering corrosive materials, particularly photographic dyes and emulsions. Gear micropump 10, as fully described below, eliminates pulsation during coating of photographic films or papers. Pulsation causes non-uniform coating thickness because continuous fluid metering is affected. It has been demonstrated that stainless steel shafts lose their tolerance due to wear and that causes the gear assembly in existing micropumps to misalign. As a result, pumping inefficiency and pulsation occurs during fluid delivery. We have found that pulsation during delivery of a photographic materials, such as a dye or emulsion, in a web coating process can be eliminated by carefully selecting gear shaft material. We used tough and corrosion resistant zirconia ceramic having primarily tetragonal crystal phase. In U.S. Pat. No. 5,411,690, hereby incorporated herein by reference, a method is taught for making the preferred tough zirconia ceramic material having a tetragonal crystal phase and comprising zirconia powder and a dopant like yttria in a specified amount. The use of zirconia and zirconia composite ceramic shafts in place of stainless steel eliminates the pulsation and also surprisingly improves considerably the reliability and the service life of the micropump. Since zirconia and zirconia composite ceramics are very resistant to many aggressive chemicals including photographic emulsions and dyes, prolonged use of the shafts are accomplished. Moreover, high hardness and toughness render the zirconia ceramic shafts resistant to fracture, chipping, wear and abrasion. It is important to appreciate that the improved gear micropump 10 of the invention, as described in details below, is primarily useful in precision metering of emulsions and dyes in the photographic film and paper manufacturing processes. However, skilled artisans will nonetheless appreciate that there exists other important and obvious applications of the micropump 10, such as delivery of chemicals and other corrosive fluids.

Referring again to FIG. 1, the improved gear micropump 10 of the invention has a pump body 12 formed with a gear receiving means 14 The pump body 12 includes a fluid inlet end 15 and a fluid discharge end (not shown). A pair of intermeshing gears 16,18 are arranged in the gear receiving means 14 between the fluid inlet end 15 and the fluid discharge end. Bearing means, preferably a plain bearings, are arranged in a bearing receiving means 22. In the preferred embodiment of the invention, the bearing receiving means 22 is arranged in pump body 12. Further, it is important to the invention that a pair of shafts 24, 26, each made of a zirconia ceramic material (described in details below), are rotatably supported in the bearing receiving means 22. Shaft 24 is driven shaft: and, shaft 26 is driving shaft. Shaft 26 is preferably driven by a magnetic means although skilled artisans will appreciate that a motor could also be used to drive shaft 26. Moreover, intermeshing gears 16, 18 are rotatably mounted on the zirconia ceramic shafts 24, 26.

Figure 2:
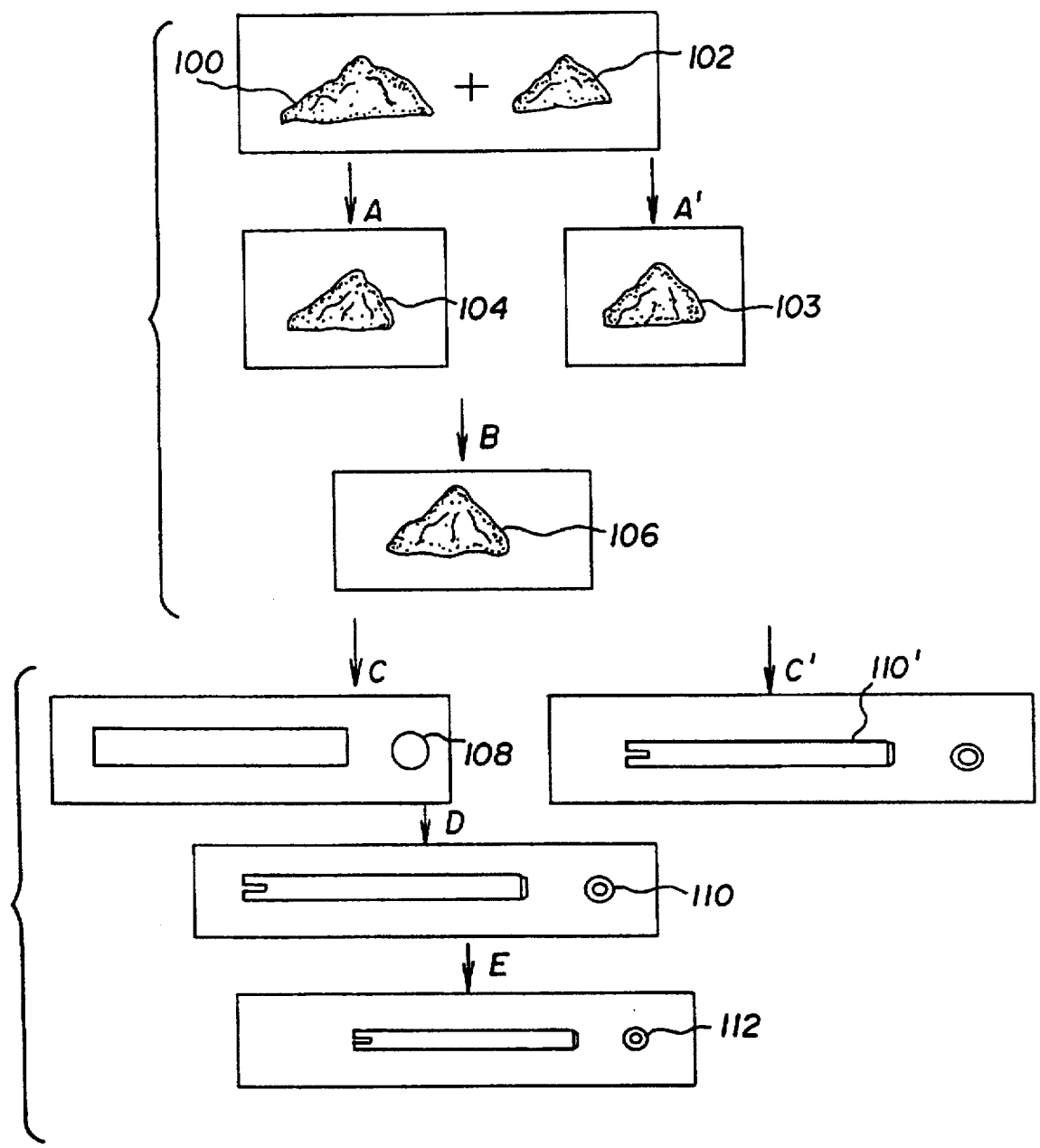
FIG. 2 illustrates the methods of making ceramic shafts of the invention.

Turning next to FIG. 2 which depicts the process for making the zirconia ceramic shafts useful for the micropump 10 of the invention. Steps A to B diagrammatically illustrates the alloying process. According to Step A, zirconia powder 100 is combined with one or more secondary oxide powders 102 to provide zirconia alloy powder 104. The preparation of zirconia alloy is well known to those skilled in the art and zirconia alloy comprising 3 mol % yttria is available commercially.

More particularly, we prefer using tetragonal ceramic material for manufacturing micropump shafts. The most preferred material which we prefer using is essentially zirconia having 100% tetragonal crystal structure. We developed this 100% tetragonal zirconia by alloying zirconia with a number of secondary oxides as described in U.S. Pat. No. 5,336,282 and 5,358,913, hereby incorporated herein by reference.

The preferred ceramic powder mixture most preferred in the method of making zirconia-alumina composites of the invention includes a particulate alumina and particulate alloys of $ZrO_2$ and additional "secondary oxide" selected from: MgO, CaO, $Y_2O_3$, $Sc_2O_3$ and $Ce_2O_3$ and other rare earth oxides (also referred to herein as "Mg-Ca-Y-Sc-rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having, wherein zirconium oxide alloy has a concentration of said secondary oxide of, in the case of $Y_2O_3$, about 0.5 to about 5 mole percent; in the case of MgO, about 0.1 to about 1.0 mole percent, in the case of $CeO_2$, about 0.5 to about 15 mole percent, in the case of $Sc_2O_3$, about 0.5 to about 7.0 mole percent and in the case of CaO from about 0.5 to about 5 mole percent, relative to the total of said zirconium oxide alloy, said compacting further comprising forming a blank, exhibit a tetragonal structure. Preferred oxides for alloying with zirconia are $Y_2O_3$, MgO, CaO, $Ce_2O_3$ and combinations of these oxides. It is preferred that the zirconia powder have high purity, greater than about 99.9 percent. Specific examples of useful zirconia alloys include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. Pat. No. 5,290,332. Such zirconia alloys are described in that patent as being useful to provide a "net-shape" ceramic article: a ceramic article that is dimensionally true after sintering and therefore does not necessitate further machining prior to use in its intended working environment.

Referring again to FIG. 2, Steps A'to B diagrammatically illustrates an alternative mixture of particulate zirconia alloy 104 and a particulate aluminum oxide 103. This alternative mixture can be achieved by mixing mechanically or chemically, for example, mixing by co-precipitation. The particulate mixture formed is from about 5 to 50 percent by weight (weight/total weight of particulate mixture) $Al_2O_3$, and preferably is from about 18 to about 20 percent and most preferably 20% by weight $Al_2O_3$.

Referring once again to FIG. 2, Step B, binders such as gelatin or polyvinyl ionomer or more preferably polyvinyl alcohol, are added to and mixed with the particulate mixture Y-TZP. 104 or a composite mixture of Y-TZP and alumina, 103, both illustrated in Steps A and A', respectively. This can be achieved preferably by spray drying or ball milling prior to placement of the mixture in a compacting device.

Further, Step B. (FIG. 2) also illustrates an alternative mixing process known to those who are proficient in the art as "compounding" in which the particulate mixture or mixtures are mixed with greater than 20% by weight of an organic binder such as paraffin at a temperature higher than the glass transition temperature of such binder for subsequent injection molding process, illustrated as Step C'.

Compacting

Turning now to compacting, the particulate mixture 106 is cold compacted using preferably an isostatic press to provide an unsintered blank 108, illustrated in FIG. 2, Step C. Unsintered blank 108 is alternatively referred to herein as a "green preform". It should be apparent to skilled artisans that a particular method of compacting the powder is not critical. The terms "cold compaction" and the like refer to compression of the particulate mixture at a temperature below glass transition or decomposition temperature of the organic binder. The green preform can be produced by such methods as cold uniaxial pressing, cold isostatic pressing, or cold extrusion. 1 5 The particulate mixture is preferably subjected to uniform compacting forces in order to provide a unsintered blank which has a uniform density. Alternatively, near net-shape green blank 110' is generated using injection molding process (Step C', FIG. 2).

Zirconia powder alloyed with 3 mol % yttria is placed in a rubber mold and isostatically pressed at 25,000 to 28,000 psi at room temperature. The billet produced for forming either a driving gear shaft 108 (FIG. 3) and a driven gear shaft 109 (FIG. 4), both useful for the gear micropump 10 of the invention, is green machined making allowance for the shrinkage during sintering as shown in FIGS. 5–6. The shrinkage was controlled precisely so that net- or near net-shaped sintered parts are produced. That is to say, the green parts can also be produced using dry pressing or injection molding processes. In this invention, the sintered parts are then machined to the final dimensions to meet the stringent dimensional tolerances.

FIGS. 3 and 4, respectively, illustrate unsintered blanks of the driving and driven zirconia ceramic gear shafts useful for the micropump 10 of the invention. The tolerance for OD and TIR were kept to less than +/−100 millionth of an inch. We used cold isostatic pressing as a means of compacting the powder instead of cold (dry) pressing to reduce the cost of manufacturing since no capital was expended in making expensive molds for dry pressing or injection molding. Green machining of zirconia and other ceramics is a standard practice of skilled artisans working in the ceramics art.

The particulate mixture of zirconia alloy and alumina is compacted; heated to a temperature range at which sintering will occur; sintered, that is, maintained at that temperature range for a period of time; and then cooled. In FIG. 2, element 108 represents the product of both mixing and compaction, indicated by arrows "'B' & 'C'", respectively. Compaction and sintering are generally discussed herein as two consecutive operations, as indicated by Steps "C" and "E", respectively, in FIG. 2, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 108 in FIG. 2. Blank 108 is at least partially compacted and is either unsintered or not fully sintered.

In a preferred method of the invention, the powder is cold compacted to provide a "green preform", which has a "green" density that is substantially less than the final sintered density of the ceramic article 112. It is preferred that the green density be between about 40 and about 65 percent of the final sintered density, or more preferably be about 50 percent of the final sintered density.

Thus, in accordance with FIG. 2, Step D, near-net-shape shaft 110 is formed by green machining (as discussed below) of the blank 108 using carbide tools. Then the shaft 110 is sintered to full density using preferably sintering schedules described in U.S. Pat. No. 5,336,282 and 5,358,913, hereby incorporated herein by reference, and final precision machining were made to tight tolerances using diamond tools (FIGS. 4-5).

Sintering Referring to FIG. 2, Step E, sintering of the green machined micropump shafts or injection molded micropump shafts 110 is performed in a temperature range from about 1400° C. to about 1600° C, or more preferably about 1500° C. Injection molded micropump shafts 110' are usually debinded at a lower temperature, in the range from 200° to 300° C, preferably at 220° C., prior to sintering, in order to eliminate most of the organic binders. Preferable sintering times is in the range from about 1 hour to about 3 hours, or more preferably, about 2 hours. In a particular embodiment of the methods of the invention, the sintering peak temperature is 1500° C. and that temperature is maintained for about 2 hours. It is preferred that the pre-sintered shafts 110 be slowly heated to sintering temperature and slowly cooled so as to avoid undesirable dimensional changes, distortions and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

In Operations

The zirconia gear shafts (driving and driven shafts 26,24 depicted in FIGS. 5-6) are installed in a micropump (making some minor modifications from stainless steel shafts) and then tested for pumping efficiency and reliability using water as a pumping fluid. After successfully running for a long period of time, experimental curtain coatings were undertaken using dyes and photographic emulsions as fluids. It was anticipated that tough, wear and corrosion resistant zirconia would perform better than stainless steel if the zirconia ceramic survived the stresses introduced during installation in the pump and also during the operation. Since ceramics are more brittle than stainless steels, it was not obvious whether they would withstand the stresses in a pump as experienced by gear shafts during pumping. In addition, any minor misalignment during installation of ceramic shaft would induce residual stresses which might eventually lead to abrupt failure. Although zirconia is tougher than other advanced ceramics, such as SiC, alumina or silicon nitride, it was still not obvious that zirconia shafts would perform as well or better than stainless steel shafts. Surprisingly, zirconia shafts not only outperformed the stainless steel shafts, they also eliminated the pulsation experienced by micropumps as the stainless steel shafts begin to wear slightly. It is believed that almost negligible wear of zirconia shafts after a prolonged use contributed to perfect concentric motion of the gear and shaft assembly and thus did not cause any pulsation. Ordinarily, a micropump equipped with stainless steel shafts would function perfectly for 120 to 150 hours. Contrarily, micropumps equipped with zirconia shafts ran efficiently longer than 1000 hours with almost tenfold increase in productivity.

EXAMPLES

Working Example 1:

Green parts were made from high purity zirconia alloyed with 3 mol % yttria, spray dried and containing no organic binder. The powder was packed inside a rubber mold and then pressed inside a hydrostatic press chamber between 25,000 and 30,000 psi. The green part (billet) was replaced from the mold and machined allowing for approximately 22% shrinkage. The parts were then sintered in air at 1400° to 1600° C., preferably at 1500° C. for 2 hours to a better than 99.99% theoretical density (6.08 g/cc). The control of material composition, particle size, green density, and sintering schedule enabled controlling the shrinkage to near net-shaped and the sintered parts required very minimum machining.

The gear shafts can also be made from zirconia-alumina composites (zirconia +5–50 wt. % alumina) and similar composite ceramics which have fracture toughness in excess of 6 MPa√m.

Working Example 2:

The zirconia shafts were installed in the micropump and were aligned such that the concentricity during revolution was kept within +/−1100 millionth of an inch. The micropumps were run in a closed circuit loop with water as the fluid for an extended period of time such that under that condition a pump equipped with stainless steel shaft would fail. While the pump was run continuously for at least 120 hours, pressure and temperature of the discharged water were monitored for its efficiency. The pump was dismantled and all of its components were examined for any wear or damage or abnonnality. All the components were in good condition. Another pump was equipped with zirconia shaft and was placed in an emulsion coating machine. The machine yielded flawless uniform coating for longer than 1000 hours.

Comparative Example 1

Zirconia powder alloyed with 3 mol % yttria and containing organic PVA binder (3% by weight) was pressed in a cold isostatic chamber between 25,000 and 30,000 psi. The green parts were broken into many pieces and the powder tended to stick to the rubber mold wall. Lubricant was applied on the mold wall without any success. The inner mold wall was also lined with wax paper to prevent the powder from sticking to the mold wall and that also proved to be useless.

Comparative Example 2

Gear micropump shafts were also made from 99.9% pure $Al_2O_3$ (ALCOA grade AG-16), exactly the same way as the zirconia shafts. A set of plastic driving and driven gears was equipped with alumina shafts in a gear micropump and ran with only water. After a short while the fluid delivery speed of the pump started to fluctuate and the pressure dropped and after a while it ceased to work. The pump was disassembled and thoroughly examined. It was noticed that the seat on which the shaft was residing was slightly worn out and one of the shafts (driving gear shaft) was chipped and non-functional. A new pair of shafts were installed and pumped photographic emulsion for experimental web coating. After a short duration (approximately 24 hours), the pump delivery system started mildly pulsating causing non-uniform coating. The pump was allowed to run for longer than a week while the pulsation persisted and generated non-uniform coating. The pump was stopped, disassembled, and examined. The shafts chipped in several places and many 15 components inside the pump had wear marks. Thus, it was concluded that alumina ceramic shafts are not a good substitute for stainless steel in this application.

Although zirconia is known to be very hard and wear-resistant, yet it has high enough fracture toughness to behave like a steel. Many ceramics like $Al_2O_3$, SiC, $Si_3N_4$, etc. are more brittle and very prone to chipping in applications such as shafts in a gear pump. Also, many structural ceramics have higher elastic modulus and as a result they are more stiff than stainless steel and are not forgiving. Zirconia has elastic modulus comparable to stainless steel (Stainless steel: 30 mpsi and zirconia 32 mpsi). In this application, plastic gears are used and they are not of very high precision. So, the shafts need to be a little forgiving to adjust for any misalignment in the enmeshing gears. Zirconia shafts are more forgiving than other structural ceramics. Alumina toughened zirconia (5–50% by weight alumina) also behaves similarly. In other words, zirconia and alumina toughened zirconia are surprisingly the best ceramic materials for this application.

The invention has thus been described in detail with particular reference to preferred embodiments thereof, but it will be understood that variations and modifications can be effected within the spirit and scope of the invention as described therein above and as defined in the appended claims.

We claim:

1. An improved gear micropump for delivering photographic materials, said gear micropump being of the type having a pump body formed with a gear receiving means, said pump body having a fluid inlet end and a fluid discharge end; a pair of intermeshing gears arranged in said gear receiving means between said fluid inlet end and said fluid discharge end; bearing means arranged in a bearing receiving means; and, wherein said improvement comprises:

a pair of 100% tetragonal zirconia ceramic shafts rotatably received in said bearing means, and wherein said pair of intermeshing gears each being mounted on one of said zirconia ceramic shafts.

2. The gear micropump of claim 1, wherein one of said pair of zirconia ceramic shafts is a driven shaft and one a driving shaft.

3. The gear micro-pump of claim 1, wherein said pair of zirconia ceramic shafts each comprises from about 0.5 mole percent yttria to about 5.0 mole percent yttria.

4. The micropump of claim 3, wherein said pair of zirconia ceramic shafts each comprises from about 3 mole percent yttria.

5. An improved ger micropump for delivering photographic materials, said gear micropump being of the type having a pump body formed with a gear receiving means, said pump body having a fluid inlet end and a fluid discharge end; a pair of intermeshing gears arranged in said gear receiving means between said fluid inlet end and said fluid discharge end; bearing means arranged in a bearing receiving means; and, wherein said improvement comprises:

a pair of 100% tetragonal zirconia composite ceramic shafts rotatably supported in said bearing means, and wherein said pair of intermeshing gears each being mounted on one of said zirconia composite ceramic shafts.

6. The gear micropump of claim 5 wherein said pair of zirconia ceramic shafts each comprises from about 0.5 mole percent yttria to about 5.0 mole percent yttria.

7. The micropump of claim 6 wherein said pair of zirconia ceramic shafts each comprises about 3 mole percent yttria.

* * * * *

UNITED STATES PATENT AND TRADEMARK OFFICE
CERTIFICATE OF CORRECTION

PATENT NO. : 5,762,485
DATED : June 9, 1998
INVENTOR(S) : Syamal K. Ghosh, et. al.

It is certified that error appears in the above-identified patent and that said Letters Patent is hereby corrected as shown below:

Column 4, line 5:
    after "16, 18 are" delete "rotatably".

Column 8, line 45 (Claim 4):
    after "each comprises" delete "from about".

Column 8, line 47 (Claim 5):
    after "An improved" delete "ger" and replace with --gear--.

Signed and Sealed this

Twelfth Day of January, 1999

Attest:

Attesting Officer     *Acting Commissioner of Patents and Trademarks*